(12) United States Patent
Kwak et al.

(10) Patent No.: US 11,543,566 B2
(45) Date of Patent: Jan. 3, 2023

(54) APPARATUS AND METHOD FOR DISPLAYING IMAGE AND COMPUTER PROGRAM THEREOF

(71) Applicant: SAMSUNG ELECTRONICS CO., LTD., Suwon-si (KR)

(72) Inventors: Kyusub Kwak, Suwon-si (KR); Kyookeun Lee, Suwon-si (KR); Wonjun Lee, Suwon-si (KR); Myongjo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 388 days.

(21) Appl. No.: 16/715,163

(22) Filed: Dec. 16, 2019

(65) Prior Publication Data
US 2020/0192007 A1    Jun. 18, 2020

(30) Foreign Application Priority Data
Dec. 18, 2018  (KR) .................. 10-2018-0164313

(51) Int. Cl.
| G02B 3/12 | (2006.01) |
| G02B 3/14 | (2006.01) |
| G02B 27/00 | (2006.01) |
| G02B 27/01 | (2006.01) |
| G02B 6/28 | (2006.01) |

(52) U.S. Cl.
CPC ............. *G02B 3/14* (2013.01); *G02B 6/28* (2013.01); *G02B 27/0075* (2013.01); *G02B 27/0093* (2013.01); *G02B 27/0172* (2013.01)

(58) Field of Classification Search
CPC ........ G02B 3/14; G02B 6/28; G02B 27/0075; G02B 27/0093; G02B 27/0172; G02B 6/0076; G02B 2027/0185; G02B 2027/0187; G02B 6/00; G02B 3/12
USPC .......................................................... 359/666
See application file for complete search history.

(56) References Cited

U.S. PATENT DOCUMENTS

| 10,055,889 B2 | 8/2018 | Bar-Zeev et al. |
| 10,914,953 B1 * | 2/2021 | Lam .......... G02B 6/00 |
| 2006/0132914 A1 | 6/2006 | Weiss et al. |

(Continued)

FOREIGN PATENT DOCUMENTS

| WO | 2017/060717 A1 | 4/2017 |
| WO | 2018/138714 A1 | 8/2018 |

OTHER PUBLICATIONS

Communication dated Jul. 29, 2021 issued by the European Patent Office in European Application No. 19900246.0.

(Continued)

*Primary Examiner* — Thomas K Pham
*Assistant Examiner* — Henry A Duong
(74) *Attorney, Agent, or Firm* — Sughrue Mion, PLLC (57) ABSTRACT

An image display apparatus including a first waveguide, a second waveguide, a focus tunable lens positioned between the first waveguide and the second waveguide, and a display engine configured to control a focal length of the focus tunable lens and control the display engine to output first light forming the first virtual image and second light forming the second virtual image, wherein at least a portion of the first light is diffracted from the first waveguide and at least a portion of the second light diffracted from the second waveguide is incident on the first waveguide through the focus tunable lens.

12 Claims, 8 Drawing Sheets

(56) References Cited

U.S. PATENT DOCUMENTS

| | | |
|---|---|---|
| 2017/0206713 A1 | 7/2017 | Lo et al. |
| 2017/0293145 A1 | 10/2017 | Miller et al. |
| 2018/0164599 A1 | 6/2018 | Hu |
| 2018/0210146 A1 | 7/2018 | Klug et al. |
| 2018/0275394 A1* | 9/2018 | Yeoh ........................ G02B 3/14 |
| 2019/0227319 A1* | 7/2019 | Trail .................. G02B 27/0081 |

OTHER PUBLICATIONS

Communication dated Mar. 27, 2020 issued by the International Searching Authority in counterpart Application No. PCT/KR2019/017469 (PCT/ISA/220, PCT/ISA/210, and PCT/ISA/237).
Communication dated Aug. 9, 2022 issued by the European Patent Office in European Patent Application No. 19900246.0.

* cited by examiner

APPARATUS AND METHOD FOR DISPLAYING IMAGE AND COMPUTER PROGRAM THEREOF

CROSS-REFERENCE TO RELATED APPLICATION(S)

This application is based on and claims priority under 35 U.S.C. § 119 from Korean Patent Application No. 10-2018-0164313, filed on Dec. 18, 2018, in the Korean Intellectual Property Office, the disclosure of which is incorporated by reference herein in its entirety.

BACKGROUND

1. Field

Embodiments of the disclosure relate to an apparatus for displaying an image, a method of displaying an image, and a computer program product including a recording medium storing a program for executing the method of displaying an image.

2. Description of Related Art

Augmented reality (AR) technology is technology whereby a virtual object or information is combined with a real environment such that the virtual object or information appears to exist in the real environment. Modern computing and display technologies have enabled the development of systems for AR experiences in which a digitally reconstructed image or part thereof is presented to a user such that it can be considered or perceived as reality by the user.

As much attention has been paid to AR technology, various technologies for realizing AR are actively being developed. In particular, research has been conducted on near-eye display technology for displaying an image such that the image is projected directly onto a user's retinas.

SUMMARY

Provided are an image display method and apparatus for more effectively controlling a depth of a positon at which a virtual image is displayed when the virtual image is displayed to be superimposed on a real-world image.

Additional aspects will be set forth in part in the description which follows and, in part, will be apparent from the description, or may be learned by practice of the presented embodiments of the disclosure.

According to an embodiment of the disclosure, an image display apparatus includes a first waveguide; a second waveguide; a first focus tunable lens positioned between the first waveguide and the second waveguide; a display engine configured to control a focal length of the focus tunable lens, control the display engine to output first light forming the first virtual image and second light forming the second virtual image, wherein at least a portion of the first light is diffracted from the first waveguide and at least a portion of the second light diffracted from the second waveguide is incident on the first waveguide through the focus tunable lens.

In one embodiment of the disclosure, the display engine may be further configured to determine the focal length of the focus tunable lens based on distance information between the first virtual image and the second virtual image and based on the determined focal length, supply an electrical signal to the focus tunable lens.

In one embodiment of the disclosure, the image display apparatus may further include an other focus tunable lens positioned between the display engine and the first waveguide, wherein the at least the portion of the first light diffracted from the first waveguide is pass through the other focus tunable lens.

In one embodiment of the disclosure, the display engine may be further configured to determine a focal length of the first focus tunable lens positioned between the first waveguide and the second waveguide and a focal length of the other focus tunable lens positioned between the first waveguide and based on each of the focal lengths, supply electrical signals to the focus tunable lens and the other focus tunable lens.

In one embodiment of the disclosure, the image display apparatus may further include a sensor configured to track a user's line of sight, and the display engine may determine the focal length of the first focus tunable lens, based on the user's line of sight.

In one embodiment of the disclosure, the image display apparatus may further include an optical compensation element at one side of the second waveguide, and the display engine may determine a focal length of the optical compensation element based on the focal length of the focus tunable lens, and supplies an electrical signal corresponding to the determined focal length to the optical compensation element.

In one embodiment of the disclosure, the first focus tunable lens may include at least one of a liquid crystal (LC) plate, an LC lens, a liquid lens, or an active diffraction element.

According to another embodiment of the disclosure, an image display method includes obtaining a first virtual image and a second virtual image; controlling a focal length of a focus tunable lens provided between a first waveguide and a second waveguide; and outputting first light forming the first virtual image and second light forming the second virtual image, herein at least a portion of the first light is diffracted from the first waveguide and at least a portion of the second light diffracted from the second waveguide is incident on the first waveguide through the focus tunable lens.

According to another embodiment of the disclosure, a computer program product includes a recording medium storing a program to perform: obtaining a first virtual image and a second virtual image; controlling a focal length of a focus tunable lens positioned between a first waveguide and a second waveguide; and outputting first light forming the first virtual image and second light forming the second virtual image, wherein at least a portion of the first light is diffracted from the first waveguide and at least a portion of the second light diffracted from the second waveguide is incident on the first waveguide through the focus tunable lens.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

The terms used herein will be briefly described and then the disclosure will be described in detail.

In the disclosure, general terms that have been widely used nowadays are selected, when possible, in consideration of functions of the disclosure, but non-general terms may be selected according to the intentions of technicians in the this art, precedents, or new technologies, etc. Some terms may be arbitrarily chosen by the present applicant. In this case, the meanings of these terms will be explained in corresponding parts of the disclosure in detail. Accordingly, the terms used herein should be defined not based on the names thereof but based on the meanings thereof and the whole context of the disclosure.

It will be understood that, although the terms first, second, etc., may be used herein to describe various elements, the elements should not be limited by these terms. These terms are only used to distinguish one element from another element. For example, a first element could be termed a second element without departing from the scope of the disclosure. Similarly, a second element could be termed a first element. As used herein, the term "and/or" includes any and all combinations of one or more of the associated listed items.

It will be understood that when an element is referred to as "including" another element, the element may further include other elements unless mentioned otherwise. The term "unit" used herein should be understood as software or a hardware component, such as a field programmable gate array (FPGA) or an application-specific integrated circuit (ASIC), which performs certain functions. However, the term "unit" is not limited to software or hardware. The term "unit" may be configured to be stored in an addressable storage medium or to reproduce one or more processors. Thus, for example, the term "unit" may include components, such as software components, object-oriented software components, class components, and/or task components, functions, attributes, procedures, subroutines, segments of program code, drivers, firmware, microcode, a circuit, data, database, data structures, tables, arrays, and parameters. Functions provided in components and "units" may be combined to obtain a small number of components and "units" or divided into sub-components and "sub-units".

Embodiments of the disclosure will be described in detail with reference to the accompanying drawings below such that those of ordinary skill in the art may easily implement them. However, the disclosure may be embodied in many different forms and is not limited to embodiments set forth herein. In the drawings, for clarity, parts that are not related to describing the disclosure are omitted. Throughout the specification, like reference numerals are assigned to like elements. Throughout the disclosure, the expression "at least one of a, b or c" indicates only a, only b, only c, both a and b, both a and c, both b and c, all of a, b, and c, or variations thereof.

Figure 1:
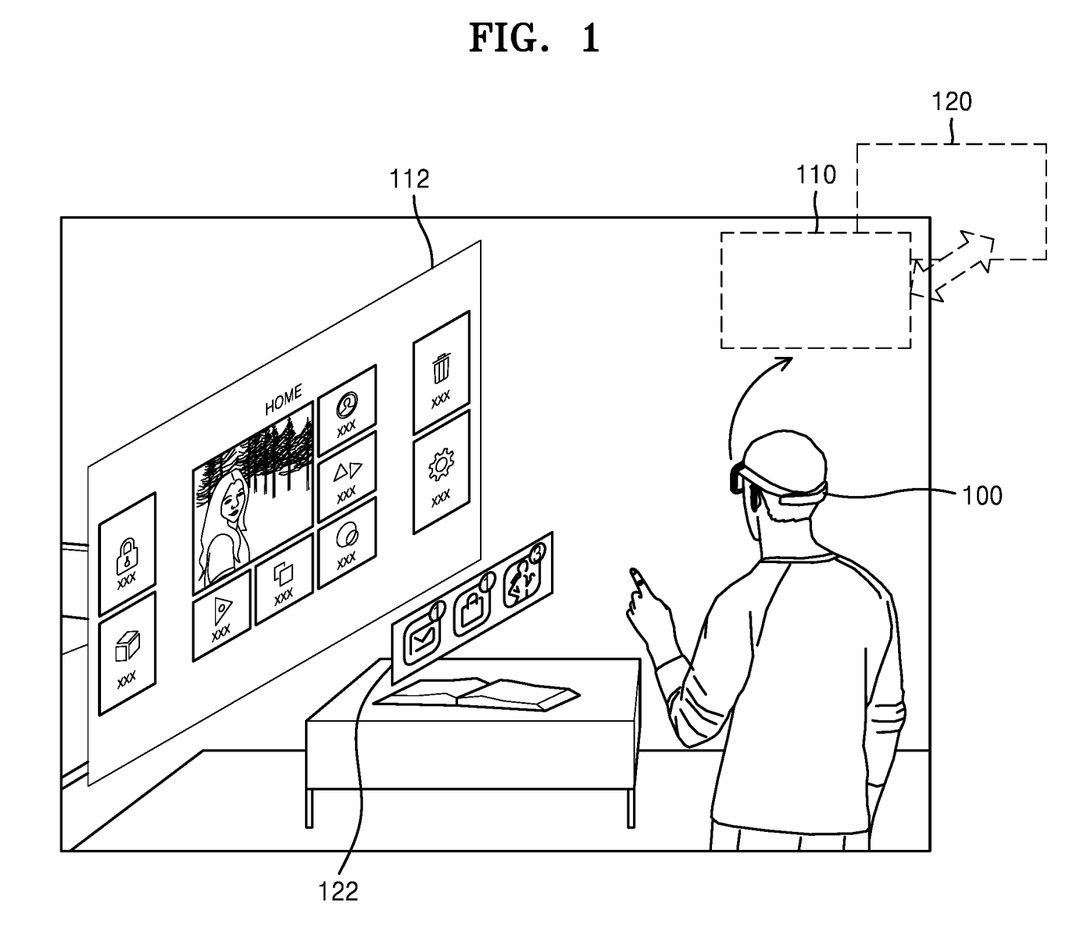
FIG. 1 is a conceptual diagram illustrating an image display method according to an embodiment of the disclosure.

FIG. 1 is a conceptual diagram illustrating an image display method according to an embodiment of the disclosure.

In an embodiment of the disclosure, an image display apparatus 100 may output, for example, a first virtual image 110 superimposed on the real world so that a user may experience augmented reality (AR). When the image display apparatus 100 displays a plurality of first and second virtual images 110 and 120, the plurality of first and second virtual images 110 and 120 need be displayed at appropriate positions on a real-world space according to the user's need.

For example, referring to FIG. 1, in the image display apparatus 100, a home screen image 112 in which icons for execution of applications are displayed and a notification screen image 122 in which messages transmitted to a user or the like are displayed may be displayed at positions having different depth values. In this case, the notification screen image 122 may be displayed at a position closer to the user than the home screen image 112 so that the user may quickly view a notification.

In one embodiment of the disclosure, in order to adjust the depth values of the positions of the plurality of first and second virtual images 110 and 120, the image display apparatus 100 may display the first virtual image 110 at a position having a fixed depth value among the plurality of first and second virtual images 110 and 120, and change a depth value of a position at which the second virtual image 120 is to be displayed. To this end, in one embodiment of the disclosure, the image display apparatus 100 may include an optical element between a first waveguide on which light forming the first virtual image 110 is incident and a second waveguide on which light forming the second virtual image 120 is incident. In this case, the optical element is an active element, and the image display apparatus 100 may control a focal length more easily by supplying an electrical signal to the optical element.

In particular, the image display apparatus 100 may provide an interface via which a user may more conveniently experience AR by fixing the depth value of the first virtual image 110 including information to be displayed at a fixed position among the plurality of first and second virtual images 110 and 120 and changing the depth value of the second virtual image 120 including information to be displayed while changing a position thereof through a focus tunable lens.

A method of controlling a focal length by the image display apparatus 100 will be described in detail with reference to FIG. 2 below.

In one embodiment of the disclosure, the image display apparatus 100 may be smart glasses, a wearable display, a near-eye display, a three-dimensional (3D) display, or the like but is not limited thereto.

Figure 2:
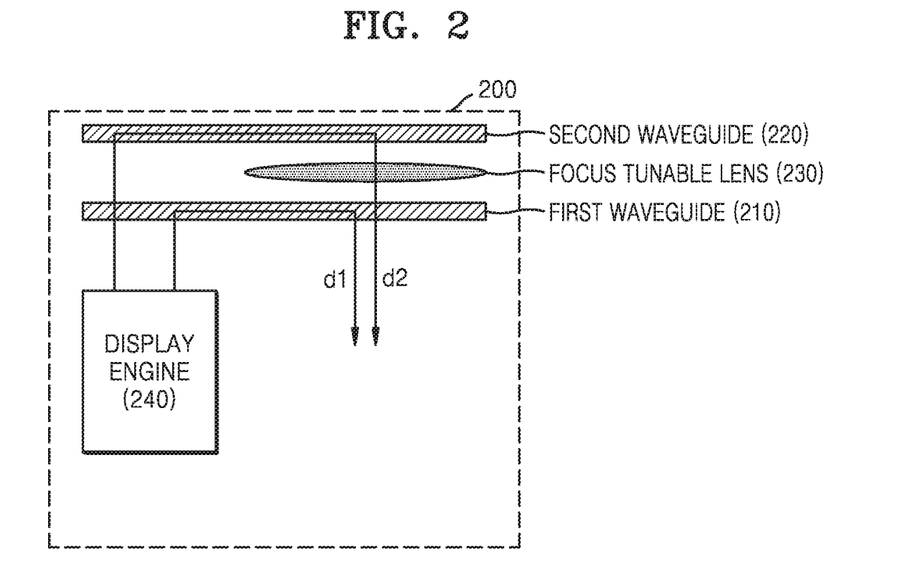
FIG. 2 is a diagram illustrating a structure of an image display apparatus according to an embodiment of the disclosure.

FIG. 2 is a diagram illustrating a structure of an image display apparatus 200 according to an embodiment of the disclosure.

Referring to FIG. 2, the image display apparatus 200 may include a first waveguide 210, a second waveguide 220, a focus tunable lens 230, and a display engine 240. However, these elements are merely examples, and the image display apparatus 200 may further include other elements or may include only some of the elements.

The first waveguide 210 may receive light forming a first virtual image from the display engine 240. At least a portion of the light incident on the first waveguide 210 may be diffracted and perceived by a user's retinas.

The second waveguide 220 may receive light forming a second virtual image from the display engine 240. At least a portion of the light incident on the second waveguide 220 may be diffracted. In this case, the diffracted light may pass through the focus tunable lens 230 and then be perceived by a user's retinas.

The light diffracted by the first waveguide 210 may be perceived by the user's retinas without passing through the focus tunable lens 230. In this case, it is assumed that depth information of the first virtual image perceived by the user's retinas is d1. In contrast, the light diffracted by the second waveguide 220 passes through the focus tunable lens 230 and thus depth information thereof may vary according to a focal length of the focus tunable lens 230. For example, the depth information of the second virtual image may be d2.

In one embodiment of the disclosure, as light diffracted by the first waveguide 210 has fixed depth information, the display engine 240 may output a virtual image for which depth information is to be fixedly displayed to the first waveguide 210. As depth information of light diffracted by the second waveguide 220 varies according to a focal length, the display engine 240 may change a focal length of the focus tunable lens 230 to control the depth information of the light diffracted by the second waveguide 220.

For example, when depth information of the second waveguide 220 is to be set to d2, the display engine 240 may determine a focal length of the focus tunable lens 230 to be x to correspond to the depth information d2. Furthermore, the display engine 240 may supply an electrical signal corresponding to the determined focal length. The focus tunable lens 230 according to the present embodiment of the disclosure may be an active element and may have a focal length determined as an electrical signal is applied thereto. The focus tunable lens 230 may include, for example, at least one of an LC plate, a liquid crystal lens, a liquid lens, or an active diffraction element. However, these elements are merely examples and the focus tunable lens 230 is not limited thereto.

The above elements are described with respect to only one eye of a user's both eyes and thus a combination thereof may be provided for each of the user's left eye and right eye. The display engine 240 may output different images to the left eye and the right eye to reduce distortion and/or to provide a stereoscopic effect.

Figure 3:
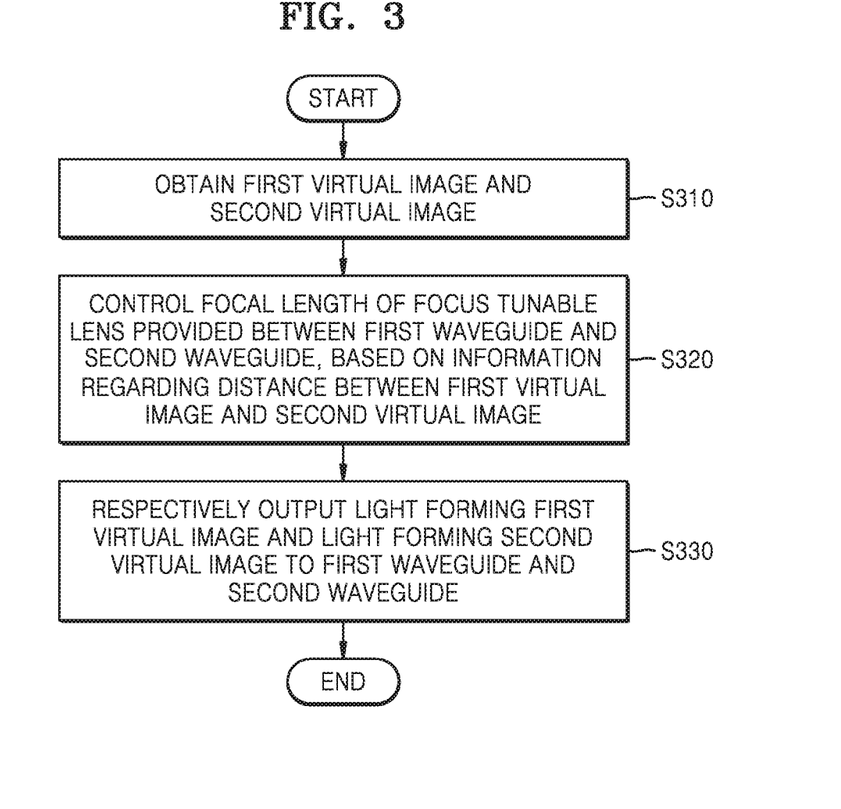
FIG. 3 is a flowchart of an image display method according to an embodiment of the disclosure.

FIG. 3 is a flowchart of an image display method according to an embodiment of the disclosure.

In operation S310, an image processing apparatus may obtain a first virtual image and a second virtual image. To implement AR, the image processing apparatus may obtain the first virtual image and the second virtual image to be displayed to be superimposed on real-word scenery, such as, by providing a real world background image (where the apparatus is a video transmission display apparatus) or via a see-through display (e.g., see-through glasses).

In operation S320, the image processing apparatus may control a focal length of a focus tunable lens provided between a first waveguide and a second waveguide to project light transmitted via the second waveguide, based on information regarding a distance between the first virtual image and the second virtual image.

In one embodiment of the disclosure, in the image processing apparatus, the focus tunable lens may be provided between the first waveguide and the second waveguide. The focus tunable lens may be an active element of which a focal length is changed by an electrical signal. The image processing apparatus may supply an electrical signal corresponding to a focal length to be changed to the focus tunable lens.

In operation S330, the image processing apparatus may respectively output light forming the first virtual image and light forming the second virtual image to the first waveguide and the second waveguide, respectively.

In one embodiment of the disclosure, according to an output of the image processing apparatus, the light forming the first virtual image may be displayed at a point of a depth d1 on a user's retina. The light forming the second virtual image may pass through the focus tunable lens and thus be displayed on a point of a depth d2 on the user's retina.

The image processing apparatus may supply an electrical signal to the focus tunable lens to change a focal length when the second virtual image is to be displayed at a distance closer or farther than the point of the depth d2. For example, when the focus tunable lens includes a liquid crystal lens, the image processing apparatus may change the focal length by changing an orientation of liquid crystal molecules of the liquid crystal lens by applying a voltage to an electrode having a pattern of a Fresnel region. However, the liquid crystal lens is only an example and the focus tunable lens is not limited thereto.

Figure 4:
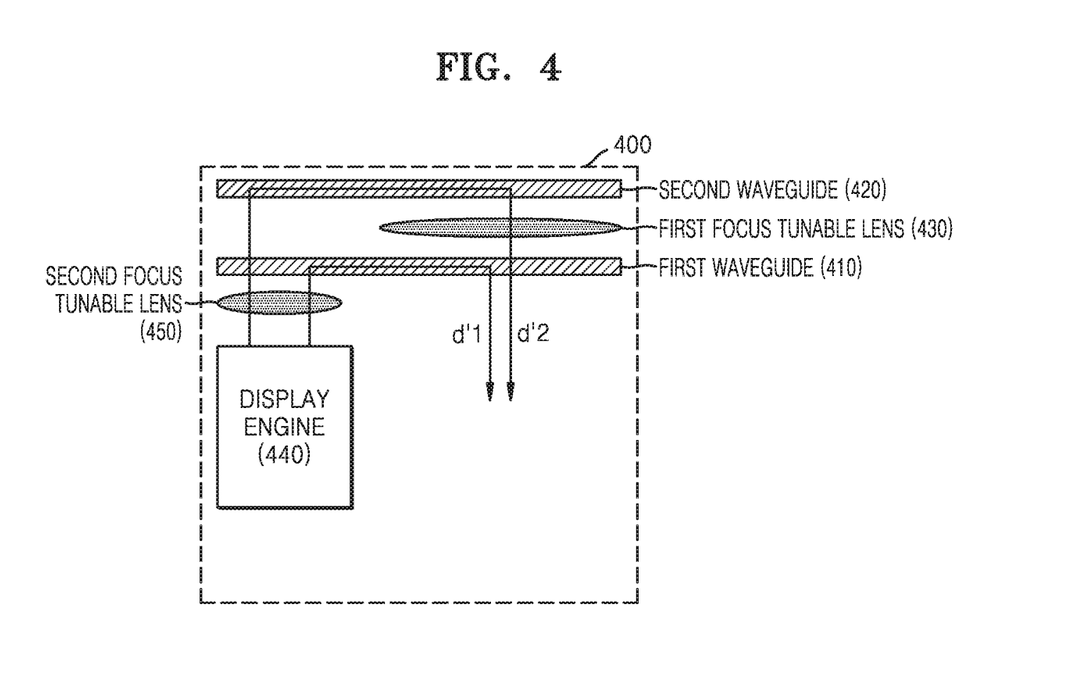
FIG. 4 is a diagram illustrating a structure of an image display apparatus according to another embodiment of the disclosure.

FIG. 4 is a diagram illustrating a structure of an image display apparatus 400 according to another embodiment of the disclosure.

Referring to FIG. 4, the image display apparatus 400 may include a first waveguide 410, a second waveguide 420, a first focus tunable lens 430, a display engine 440, and a second focus tunable lens 450. However, these elements are only examples, and the image display apparatus 400 may further include other elements or may include only some of the elements.

The first waveguide 410, the second waveguide 420, and the first focus tunable lens 430 according to the present embodiment of the disclosure may respectively correspond to the first waveguide 210, the second waveguide 220, and the focus tunable lens 230 described above with reference to FIG. 2. Accordingly, a description of parts of the present embodiment of the disclosure that are the same as those described above with reference to FIG. 2 will be omitted here.

In one embodiment of the disclosure, the display engine 440 may output light forming a first virtual image and light forming a second virtual image. The light forming the first virtual image and the light forming the second virtual image may pass through the second focus tunable lens 450 and then be respectively incident on the first waveguide 410 and the second waveguide 420.

As light incident on the first waveguide 410 passes through the second focus tunable lens 450 of a focal length OP2, the first virtual image may be displayed at a position of a depth d'1. As light incident on the second waveguide 420 passes through the second focus tunable lens 450 of the focal length OP2 and the first focus tunable lens 430 of a focal length OP1, the second virtual image may be displayed at a position of a depth d'2.

The display engine 440 may output a virtual image by changing the focal length OP1 and the focal length OP2 to provide a three-dimensional (3D) virtual image to a user, as will be described in more detail with reference to FIG. 5 below.

When a focal length to be changed is determined, the display engine 440 may change the focal length by supplying an electrical signal corresponding to the focal length to the first focus tunable lens 430 and the second focus tunable lens 450.

Figure 5:
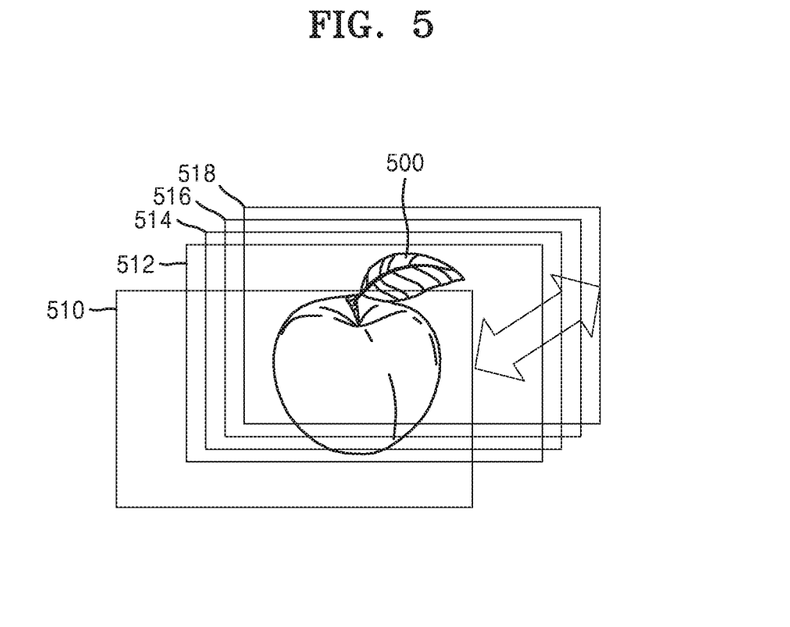
FIG. 5 is a diagram illustrating a method of displaying a three-dimensional virtual image, the method being performed by an image display apparatus, according to an embodiment of the disclosure.

FIG. 5 is a diagram illustrating a method of displaying a 3D virtual image, the method being performed by an image display apparatus, according to an embodiment of the disclosure.

In one embodiment of the disclosure, the image display apparatus may periodically output a plurality of virtual images at different distances so as to three-dimensionally represent an object. In this case, in order to change values of the distances at which the plurality of virtual images are displayed, the image display apparatus may supply an electrical signal to the first focus tunable lens 430 and the second focus tunable lens 450 described above with reference to FIG. 4.

For example, the display apparatus may periodically and respectively display a plurality of two-dimensional (2D) virtual images. For example, the display apparatus may display one or more of two-dimensional virtual images 510, 512, 514, 516, and 518 representing part of a 3D shape of an apple 500 at depths d1, d2, d3, d4, and d5, respectively, such that a user may perceive the 3D shape of the apple 500. In this case, in order to respectively display the plurality of 2D virtual images 510, 512, 514, 516, and 518 at the depths d1, d2, d3, d4, and d5, the image display apparatus may change a focal length by supplying electrical signals corresponding to these depths to the first focus tunable lens 430 and the second focus tunable lens 450. FIG. 5 shows five 2D virtual images, but an embodiment of the disclosure may have more or may have less than five 2D virtual images.

Figure 6:
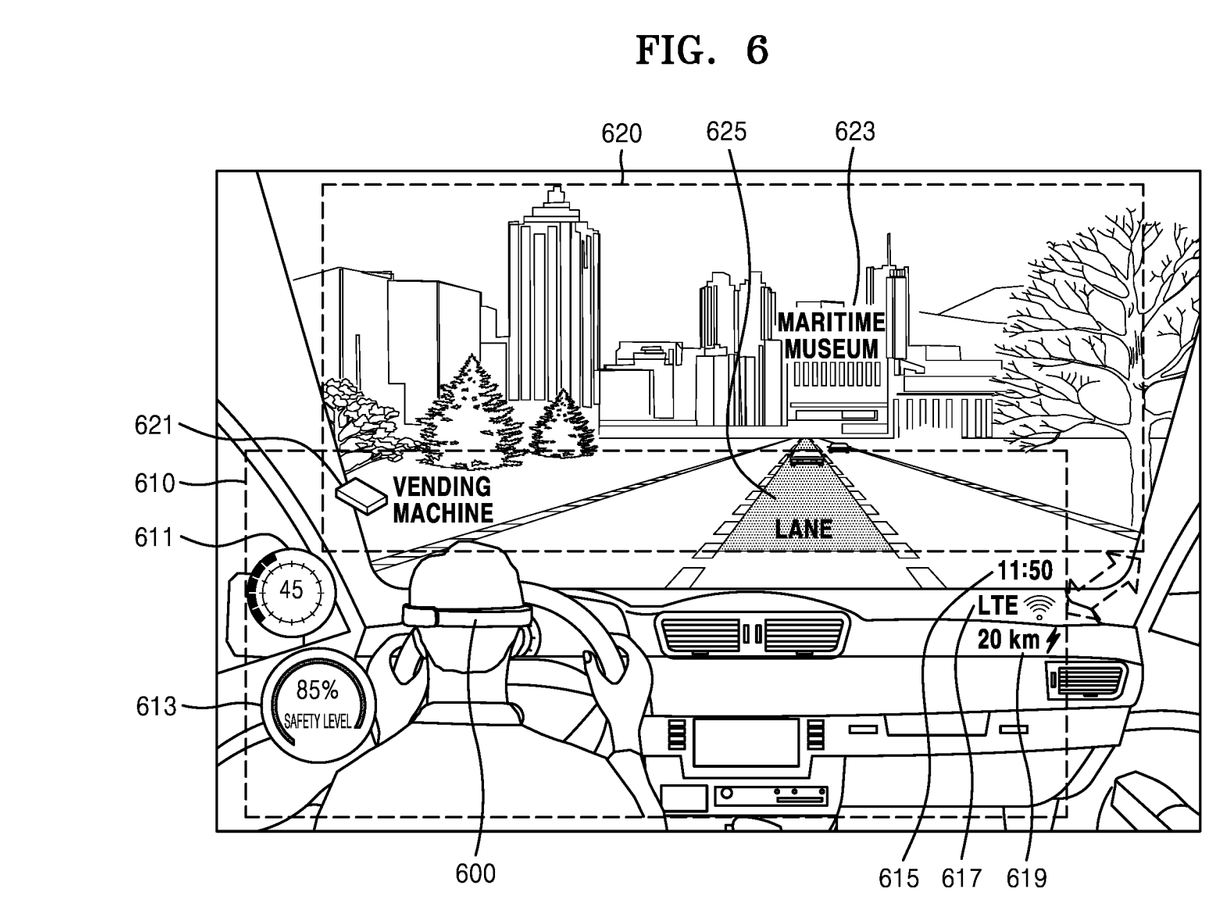
FIG. 6 is a diagram illustrating a method of displaying a plurality of virtual images during execution of a navigation application, the method being performed by an image display apparatus, according to an embodiment of the disclosure.

FIG. 6 is a diagram illustrating a method of displaying a plurality of first and second virtual images 610 and 620 during execution of a navigation application, the method being performed by an image display apparatus 600, according to an embodiment of the disclosure.

Referring to FIG. 6, when the navigation application is executed, the image display apparatus 600 may display one or more of: fuel amount information 611, stability information 613, time information 615, communication status information 617, and speed information 619 of a vehicle which a user is using (e.g., driving). The image display apparatus may also display one or more of: facility information 621 regarding a facility outside the vehicle, building information 623 regarding a building outside the vehicle, road information 625, etc. The displayed information may be superimposed on the real world scenery as shown in FIG. 6. In this case, the status information (e.g., the one or more of: the fuel amount information 611, the stability information 613, the time information 615, the communication status information 617, and/or the speed information 619 of the vehicle into which the user is using/driving) is preferably displayed at one or more fixed positions and thus the image display apparatus 600 may display the first virtual image 610 containing the status information at a position of a fixed depth value. To this end, the image display apparatus 600 may output light of the first virtual image 610 to the first waveguide. At least a portion of the light incident on the first waveguide may be diffracted and perceived by the user's retinas. In this case, the depth value of the position at which the first virtual image 610 (e.g., status information) is displayed may be fixed to d1.

Positions at which the AR information (e.g., one or more of: the facility information 621 regarding the facility outside the vehicle, the building information 623 regarding the building outside the vehicle, and/or the road information 625, etc.) are to be displayed may be variable as a user moves. Thus, the image display apparatus 600 may display the second virtual image 620 containing the AR information by variably setting a depth value thereof. To this end, the image display apparatus 600 may output light of the second virtual image 620 to the second waveguide. At least a portion of the light incident on the second waveguide may be diffracted, pass through a focus tunable lens, and then be perceived by the user's retinas. The depth value of the second virtual image 620 may be variably set according to a focal length of the focus tunable lens.

In one embodiment of the disclosure, in order to set a depth value of a position at which the second virtual image 620 is to be displayed to d2, the image display apparatus 600 may supply an electrical signal to the focus tunable lens such that the focus tunable lens has a focal length corresponding to the depth value d2.

Figure 7:
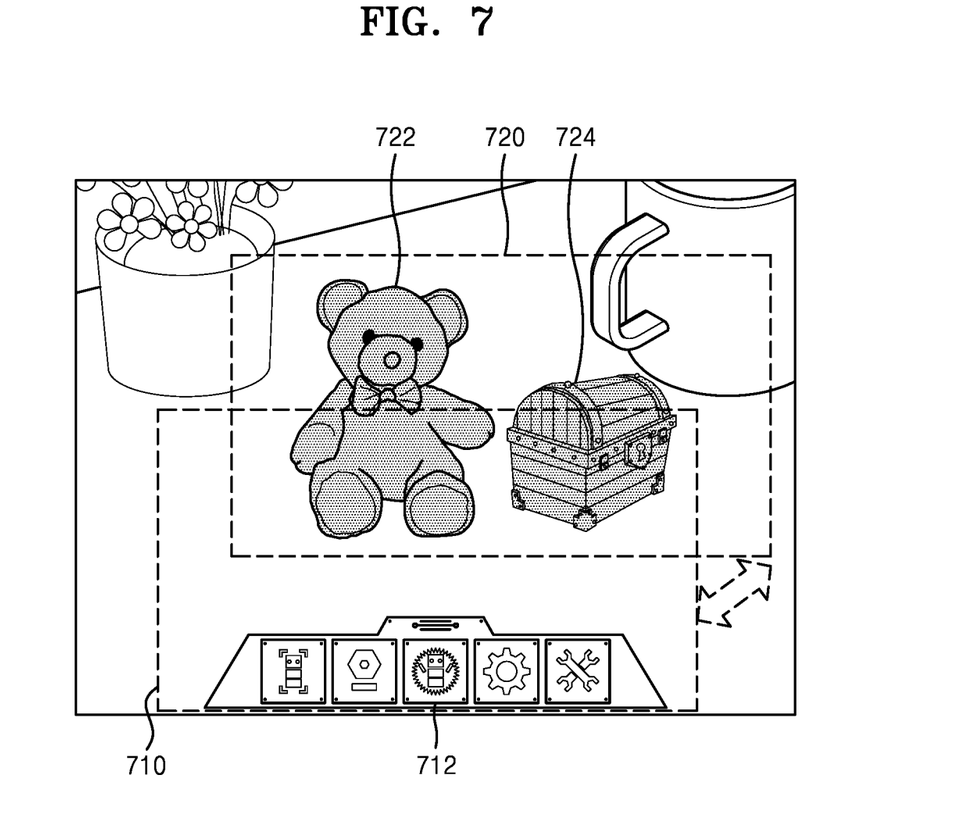
FIG. 7 is a diagram illustrating a method of displaying a plurality of virtual images during execution of a game application, the method being performed by an image display apparatus, according to an embodiment of the disclosure.

FIG. 7 is a diagram illustrating a method of displaying a plurality of first and second virtual images 710 and 720 during execution of a game application (e.g., an AR-type game), the method being performed by an image display apparatus, according to an embodiment of the disclosure.

Referring to FIG. 7, when the game application is executed, the image display apparatus may display one or more of: game environment information 712 regarding a user's game environment, a character 722, and/or an item 724, etc. to be imposed on the real world scenery. In this case, the game environment information 712 preferably is displayed at a fixed position and thus the image display apparatus may display the first virtual image 710 containing the game environment information 712 at a position of a fixed value. To this end, the image display apparatus may output light of the first virtual image 710 to a first waveguide. At least a portion of the light incident on the first waveguide may be diffracted and perceived by the user's retinas. In this case, a depth value of the position at which the first virtual image 710 is displayed may be fixed to d1.

Positions at which one or more of the character 722 and the item 724 are to be displayed may vary according to a progress of the game application. Accordingly, the image display apparatus may display the second virtual image 720 including the one or more of the character 722 and the item 724 by variably setting a depth value thereof. To this end, the image display apparatus may output light of the second virtual image 720 to a second waveguide. At least a portion of the light incident on the second waveguide may be diffracted, pass through a focus tunable lens, and then be perceived by the user's retinas. The depth value of the second virtual image 720 may be variably set according to a focal length of the focus tunable lens.

In one embodiment of the disclosure, in order to set a depth value of a position at which the second virtual image 720 is to be displayed to d2, the image display apparatus may supply an electrical signal to the focus tunable lens such that the focal length of the focus tunable lens may correspond to the depth value d2.

Figure 8:
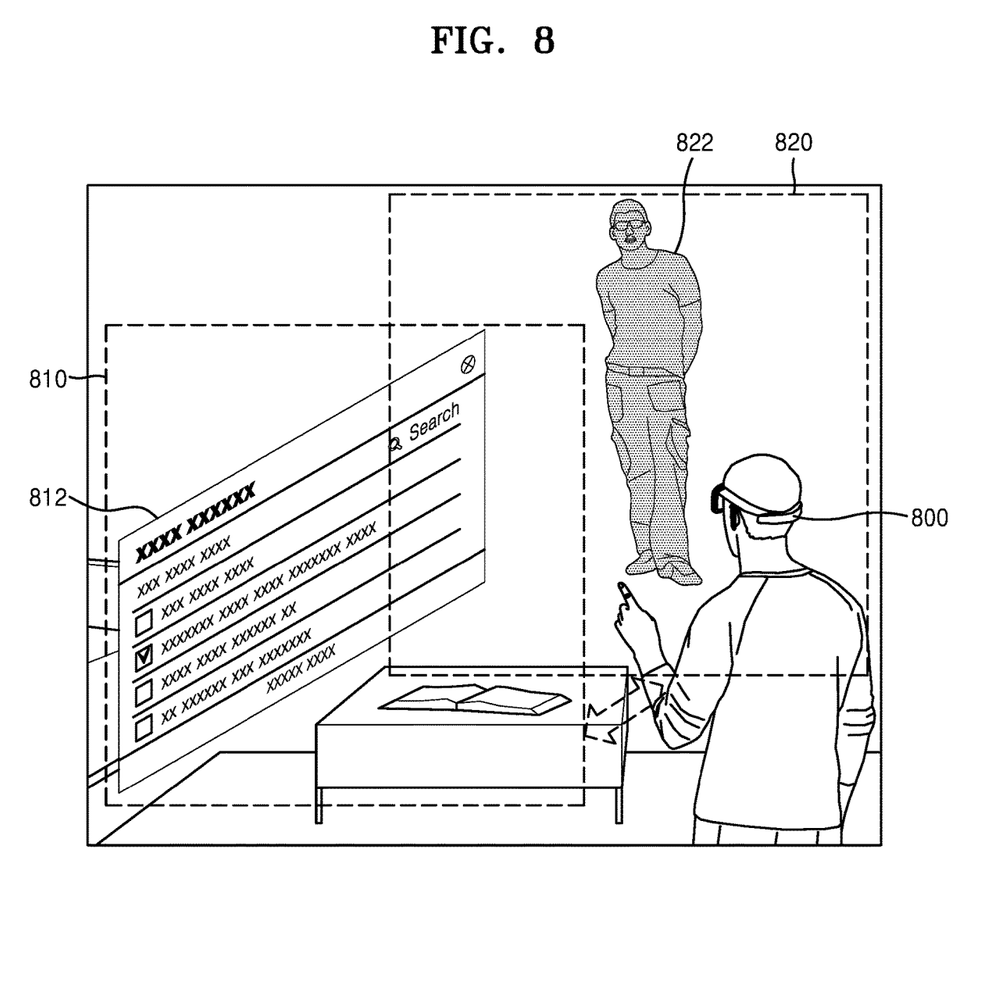
FIG. 8 is a diagram illustrating a method of displaying a plurality of virtual images during execution of a telepresence application, the method being performed by an image display apparatus, according to an embodiment of the disclosure.

FIG. 8 is a diagram illustrating a method of displaying a plurality of first and second virtual images 810 and 820 during execution of a telepresence application, the method being performed by an image display apparatus 800, according to an embodiment of the disclosure.

Referring to FIG. 8, the image display apparatus 800 may display one or more of meeting data 812, and/or a meeting attendee(s) 822, etc. superimposed on the real world scenery when a meeting is conducted through execution of a telepresence application. In this case, the meeting data 812 preferably is displayed at a fixed position and thus the image display apparatus 800 may display the first virtual image 810 including the meeting data 812 at a position of a fixed depth value. To this end, the image display apparatus 800 may output light of the first virtual image 810 to a first waveguide. At least a portion of the light incident on the first waveguide may be diffracted and perceived by a user's retinas. In this case, the depth value of the position at which the first virtual image 810 is displayed may be fixed to d1.

A position of the meeting attendee(s) 822 may vary as the meeting is being conducted. Accordingly, the image display apparatus 800 may display the second virtual image 820 including the meeting attendee 822 by variably setting a depth value thereof. To this end, the image display apparatus 800 may output light of the second virtual image 820 to a second waveguide. At least a portion of the light incident on the second waveguide may be diffracted, pass through a focus tunable lens, and then be perceived by the user's retinas. In this case, the depth value of the second virtual image 820 may be variably set according to a focal length of the focus tunable lens.

In one embodiment of the disclosure, in order to set a depth value of a position at which the second virtual image 820 is displayed to d2, the image display apparatus 800 may supply an electrical signal to the focus tunable lens such that the focal length of the focus tunable lens corresponds to d2.

Figure 9:
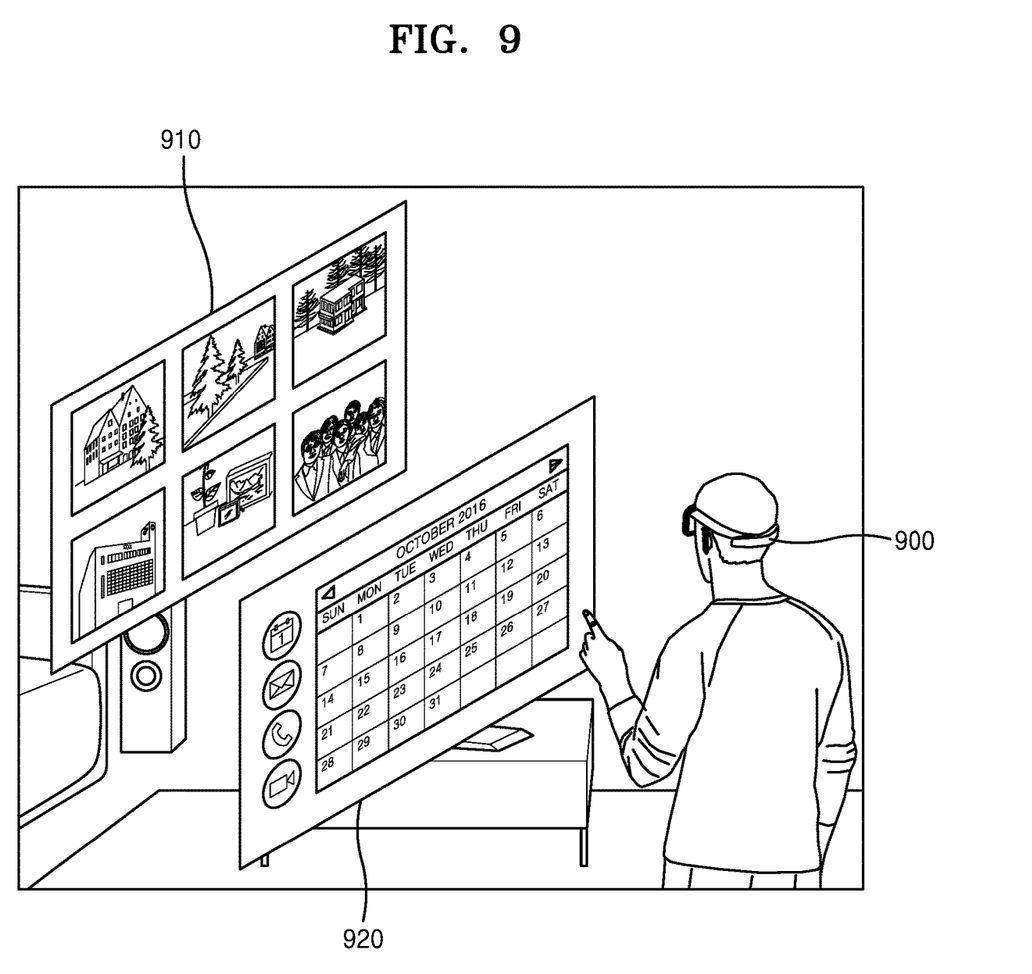
FIG. 9 is a diagram illustrating a method of displaying a plurality of virtual images during execution of a plurality of applications, the method being performed by an image display apparatus, according to an embodiment of the disclosure.

FIG. 9 is a diagram illustrating a method of displaying a plurality of first and second virtual images 910 and 920 during execution of a plurality of applications, the method being performed by an image display apparatus 900, according to an embodiment of the disclosure.

Referring to FIG. 9, when two different types of applications (e.g., a photo album application and a calendar application) are simultaneously executed, the image display apparatus 900 may display screens of execution of these applications to be superimposed on the real world scenery. In this case, when a user selects one of the applications through a touch input or the like, the image display apparatus 900 may display the screen of execution of the selected application to be closer to the user, in response to the user's touch input.

In the present embodiment of the disclosure, it is assumed that the calendar application is selected by the user. When the photo album application is not selected, the screen of execution of the photo album application preferably is displayed at a fixed position and thus the image display apparatus 900 may display the first virtual image 910 including the screen of execution of the photo album application at a position of a fixed depth value. To this end, the image display apparatus 900 may output light of the first virtual image 910 to a first waveguide. At least a portion of the light incident on the first waveguide may be diffracted and perceived by the user's retinas.

A position of the screen of the calendar application selected by the user may vary in response to the user's input. Thus, the image display apparatus 900 may display the second virtual image 920 including the screen of execution of the calendar application by variably setting a depth value thereof. To this end, the image display apparatus 900 may output light of the second virtual image 920 to a second waveguide. At least a portion of the light incident on the second waveguide may be diffracted, pass through a focus tunable lens, and then be perceived by the user's retinas. A depth value of the second virtual image 920 may be variably set according to a focal length of the focus tunable lens.

Figure 10:
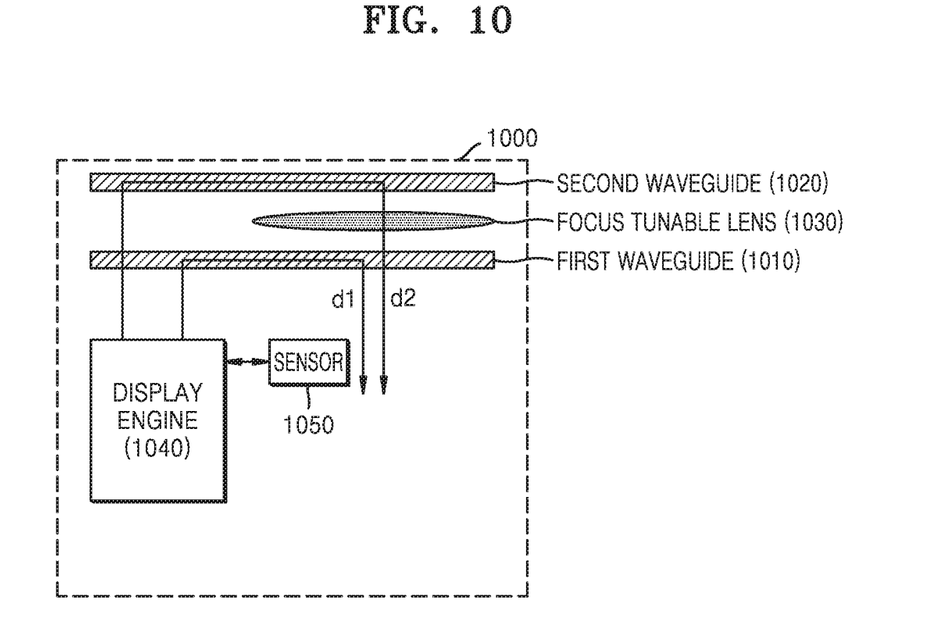
FIG. 10 is a diagram illustrating a structure of an image display apparatus according to another embodiment of the disclosure.

FIG. 10 is a diagram illustrating a structure of an image display apparatus 1000 according to another embodiment of the disclosure.

Referring to FIG. 10, the image display apparatus 1000 may include a first waveguide 1010, a second waveguide 1020, a focus tunable lens 1030, a display engine 1040, and a sensor 1050. However, these elements are merely examples and the image display apparatus 1000 may further include other elements or include only some of the elements.

The first waveguide 1010, the second waveguide 1020, and the focus tunable lens 1030 according to the present embodiment of the disclosure may respectively correspond to the first waveguide 210, the second waveguide 220, and the focus tunable lens 230 described above with reference to FIG. 2. Thus, a description of parts of the present embodiment of the disclosure that is the same as those described above with reference to FIG. 2 will be omitted here.

In one embodiment of the disclosure, the display engine 1040 may supply an electrical signal to the focus tunable lens 1030 to change a focal length of the focus tunable lens 1030.

For example, as a user's line of sight may be sensed by the sensor 1050, the display engine 1040 may change the focal length of the focus tunable lens 1030 such that the focal length corresponds to the user's line of sight.

The sensor 1050, which may be a camera or the like, may track a position of the user's pupil or the like to sense the user's line of sight, but this method is only an example and a method of sensing the user's line of sight by the sensor 1050 is not limited thereto. The sensor 1050 is not limited to a camera.

Figure 11:
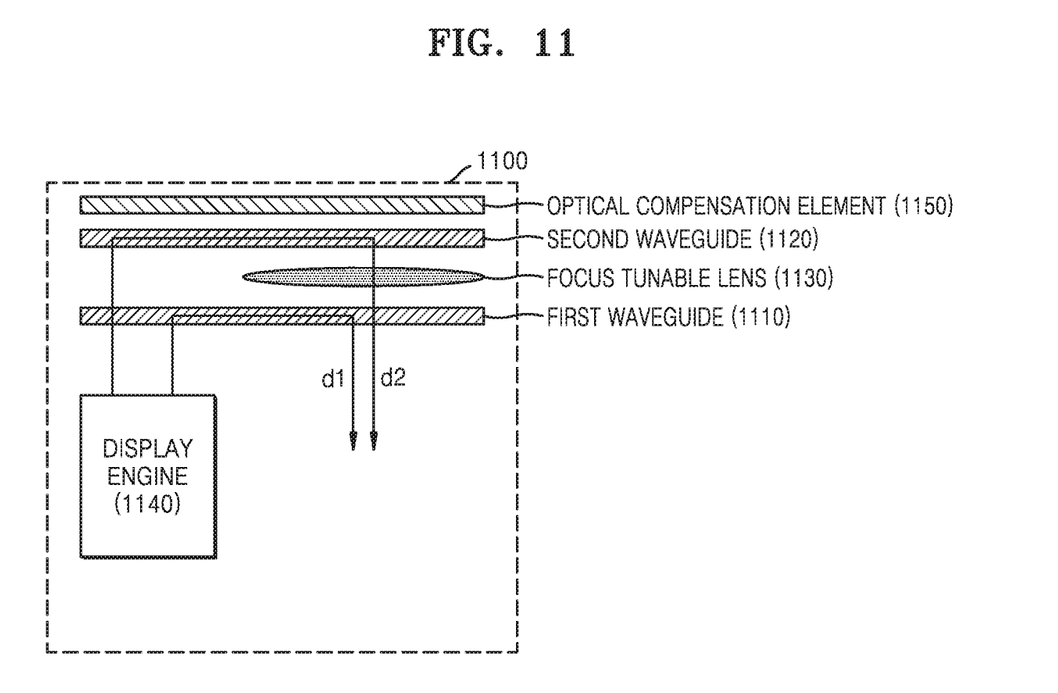
FIG. 11 is a diagram illustrating a structure of an image display apparatus according to another embodiment of the disclosure.

FIG. 11 is a diagram illustrating a structure of an image display apparatus 1100 according to another embodiment of the disclosure.

Referring to FIG. 11, the image display apparatus 1100 may include a first waveguide 1110, a second waveguide 1120, a focus tunable lens 1130, a display engine 1140, and an optical compensation element 1150. However, these elements are merely examples and the image display apparatus 1100 may further include other elements or include only some of the elements.

The first waveguide 1110, the second waveguide 1120, and the focus tunable lens 1130 according to the present embodiment of the disclosure may respectively correspond to the first waveguide 210, the second waveguide 220, and the focus tunable lens 230 described above with reference to FIG. 2. Accordingly, a description of parts of the present embodiment of the disclosure that are the same as those described above with reference to FIG. 2 will be omitted here.

In one embodiment of the disclosure, the optical compensation element 1150 may compensate for a focal length of a real-world image. For example, when the real-world image is projected onto the focus tunable lens 1130 without the optical compensation element 1150, the real-world image may be perceived as distorted.

Thus, the optical compensation element 1150 may be set to have a focal length for compensating for distortion due to a focal length of the focus tunable lens 1130. For example, when the focal length of the focus tunable lens 1130 is OP2, the focal length of the optical compensation element 1150 may be set to 1/OP2. The optical compensation element 1150 is an active element, and the display engine 1140 may apply an electrical signal corresponding to the focal length 1/OP2 to the optical compensation element 1150 to change the focal length of the focus tunable lens 1130. Accordingly, the real-world image is corrected in advance through the optical compensation element 1150 not to be distorted even when the real-world image is projected onto the focus tunable lens 1130.

A method according to an embodiment of the disclosure may be implemented in the form of a program command executable through various computer means and recorded on a computer-readable medium. The computer-readable medium may include program commands, data files, a data structure, and the like solely or in combination. The program commands recorded on the computer-readable medium may be specially designed and configured for the disclosure or be well known to and usable by one of ordinary skill in the art of computer software. Examples of the computer-readable medium include magnetic media (e.g., hard disks, floppy disks, and magnetic tapes), optical media (e.g., CD-ROMs and DVDs), magneto-optical media (e.g., floptical disks), and hardware devices specially configured to store and execute program commands (e.g., ROMs, RAMs, and flash memories). Examples of program commands include not only machine language codes prepared by a compiler, but also high-level language codes executable by a computer by using an interpreter.

Reference numerals have been used in the embodiments illustrated in the drawings and specific terms have been used to describe the embodiments of the disclosure, but the disclosure is not limited by the specific terms. The embodiments of the disclosure should be understood to include all elements that will be obvious to those of ordinary skill in the art.

Embodiments of the disclosure may be represented using functional block components and various operations. Such functional blocks may be realized by any number of hardware and/or software components configured to perform certain functions. For example, embodiments of the disclosure may employ various integrated circuit components, e.g., memory, processing elements, logic elements, look-up tables, and the like, to carry out a variety of functions under control of at least one microprocessor or other control devices. Furthermore, embodiments of the disclosure may employ the same or different types of cores, different types of CPUS, etc. As the elements of the disclosure are implemented using software programming or software elements, embodiments may be implemented with any programming or scripting language such as C, C++, Java, assembler, or the like, including various algorithms that are any combination of data structures, processes, routines or other programming elements. Functional aspects may be realized as an algorithm executed by at least one processor. In addition, the disclosure may employ prior art for electronics configuration, signal processing and/or data processing. The terms "mechanism", "element", "means", "configuration", etc. may be used broadly and are not limited to mechanical or physical components. These terms should be understood as including software routines in conjunction with processors, etc.

Particular implementations described in the embodiments of the disclosure are merely examples and are not intended to otherwise limit the scope of the embodiments of the disclosure in any way. For the sake of brevity, electronic components according to the related art, control systems, software and other functional aspects of the systems may not be described in detail. The lines or connecting elements shown in the appended drawings are intended to represent exemplary functional relationships and/or physical or logical couplings between the various elements. It should be noted that many alternative or additional functional relationships, physical connections or logical connections may be present in a practical device. In addition, no item or component is essential to the practice of the disclosure unless it is specifically described as "essential" or "critical".

The term "the" and similar referents used to describe embodiments (especially in the following claims) of the disclosure are to be construed to cover both the singular and the plural. Recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein may be performed in an appropriate order unless otherwise indicated herein or otherwise clearly contradicted by context. Embodiments of the disclosure are not limited by an order in which the operations are described herein. The use of any and all examples, or exemplary terms (e.g., "such as") provided herein, is intended merely to clearly describe the embodiments of the disclosure and does not pose a limitation on the scope of the embodiments of the disclosure unless otherwise claimed. Numerous modifications and adaptations will be readily apparent to those of ordinary skill in this art without departing from the spirit and scope of the disclosure. It would be obvious to those of ordinary skill in the art that various modifications and changes may be made in the embodiments of the disclosure by changing design conditions and factors without departing from the scope of the following claims and their equivalents.

What is claimed is:

1. An image display apparatus comprising:
   a first waveguide;
   a second waveguide;
   a first focus tunable lens positioned between the first waveguide and the second waveguide;
   a display engine configured to output first light forming a first virtual image and second light forming a second virtual image; and
   a second focus tunable lens positioned between the display engine and the first waveguide,
   wherein the first light output from the display engine passes through the second focus tunable lens and is incident on the first waveguide,
   wherein at least a portion of the first light incident on the first waveguide is diffracted from the first waveguide,
   wherein the second light output from the display engine passes through the second focus tunable lens and is incident on the second waveguide, and
   wherein at least a portion of the second light incident on the second waveguide is diffracted from the second waveguide, passes through the first focus tunable lens, and is incident on the first waveguide.

2. The image display apparatus of claim 1, wherein a focal length of the first focus tunable lens is determined based on information on a distance between the first virtual image and the second virtual image.

3. The image display apparatus of claim 1, wherein, based on a focal length of the first focus tunable lens and a focal length of the second focus tunable lens, electrical signals are supplied to the first focus tunable lens and the second focus tunable lens.

4. The image display apparatus of claim 1, further comprising a sensor configured to track a user's line of sight,
wherein the focal length of the first focus tunable lens is determined based on the user's line of sight.

5. The image display apparatus of claim 1, further comprising an optical compensation element at one side of the second waveguide,
wherein a focal length of the optical compensation element is determined based on a focal length of the first focus tunable lens.

6. The image display apparatus of claim 1, wherein each of the first focus tunable lens and the second focus tunable lens comprises at least one of a liquid crystal (LC) plate, an LC lens, a liquid lens, or an active diffraction element.

7. An image display method of an image display apparatus including a first waveguide, a second waveguide, a first focus tunable lens positioned between the first waveguide and the second waveguide, a display engine, and a second focus tunable lens positioned between the display engine and the first waveguide, the method comprising:
outputting, by the display engine, first light forming a first virtual image and second light forming a second virtual image;
controlling a focal length of the first focus tunable lens; and
controlling a focal length of the second focus tunable lens,
wherein the first light output from the display engine passes through the second focus tunable lens and is incident on the first waveguide,
wherein at least a portion of the first light incident on the first waveguide is diffracted from the first waveguide and, wherein the second light output from the display engine passes through the second focus tunable lens and is incident on the second waveguide, and
wherein at least a portion of the second light incident on the second waveguide is diffracted from the second waveguide, passes through the first focus tunable lens and is incident on the first waveguide.

8. The image display method of claim 7, wherein the controlling of the focal length of the first focus tunable lens comprises:
determining the focal length of the first focus tunable lens, based on information on a distance between the first virtual image and the second virtual image; and
based on the determined focal length, supplying an electrical signal to the first focus tunable lens.

9. The image display method of claim 7, wherein the controlling of the focal length of the first focus tunable lens comprises:
determining the focal length of the first focus tunable lens; and
based on the focal length of the first focus tunable lens, supplying an electrical signal to the first focus tunable lens.

10. The image display method of claim 7, further comprising tracking a user's line of sight,
wherein the determining of the focal length of the first focus tunable lens comprises determining the focal length of the first focus tunable lens, based on the user's line of sight.

11. The image display method of claim 7, further comprising:
determining a focal length of an optical compensation element provided at one side of the second waveguide based on the focal length of the first focus tunable lens; and
supplying an electrical signal corresponding to the determined focal length of the optical compensation element to the optical compensation element.

12. The image display method of claim 7, wherein each of the first focus tunable lens and the second focus tunable lens comprises at least one of a liquid crystal (LC) plate, an LC lens, a liquid lens, or an active diffraction element.

* * * * *